United States Patent
Chung et al.

(10) Patent No.: US 8,286,166 B2
(45) Date of Patent: Oct. 9, 2012

(54) INTERRUPTIBLE THREAD SYNCHRONIZATION METHOD AND APPARATUS

(75) Inventors: Seung-bum Chung, Seongnam-si (KR); Soo-jeong Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1242 days.

(21) Appl. No.: 11/655,928

(22) Filed: Jan. 22, 2007

(65) Prior Publication Data
US 2007/0204269 A1 Aug. 30, 2007

(30) Foreign Application Priority Data
Feb. 24, 2006 (KR) ................... 10-2006-0018411

(51) Int. Cl.
*G06F 9/46* (2006.01)
*G06F 7/00* (2006.01)
(52) U.S. Cl. ........ 718/100; 718/102; 718/107; 718/108; 707/704
(58) Field of Classification Search .................. None
See application file for complete search history.

(56) References Cited

U.S. PATENT DOCUMENTS

| | | | | |
|---|---|---|---|---|
| 5,924,098 A * | 7/1999 | Kluge | | 1/1 |
| 6,026,427 A * | 2/2000 | Nishihara et al. | | 718/106 |
| 6,108,754 A * | 8/2000 | Lindholm | | 711/122 |
| 6,938,131 B2 * | 8/2005 | Ogasawara | | 711/151 |
| 7,681,197 B1 * | 3/2010 | Kinnear | | 718/104 |
| 7,716,249 B2 * | 5/2010 | Harris et al. | | 707/796 |
| 7,844,973 B1 * | 11/2010 | Dice | | 718/108 |
| 2002/0103942 A1 * | 8/2002 | Comeau | | 709/321 |
| 2002/0129079 A1 * | 9/2002 | Long et al. | | 709/100 |
| 2002/0161816 A1 * | 10/2002 | Kawahara et al. | | 709/103 |
| 2002/0178208 A1 * | 11/2002 | Hutchison et al. | | 709/102 |
| 2003/0023656 A1 * | 1/2003 | Hutchison et al. | | 709/100 |
| 2006/0136886 A1 * | 6/2006 | Patterson et al. | | 717/141 |

FOREIGN PATENT DOCUMENTS

| | | |
|---|---|---|
| JP | 8-329020 A | 12/1996 |
| JP | 2001-188685 A | 7/2001 |
| JP | 2004-213637 A | 7/2004 |
| KR | 10-2004-0062394 A | 7/2004 |
| KR | 10-2004-0068993 A | 8/2004 |

OTHER PUBLICATIONS

Lampson, B. W. et al.: "Exerpience with processes and monitors in Mesa" Communications of the ACM USA, Feb. 2, 1980, p. 105-117.
Buhr, P. A. et al.: "Monitor classification" ACM Computing Surveys USA, Mar. 1, 1995, p. 63-107.
The Open Group: "System Interfaces" Portable Operating System Interface, Apr. 30, 2004, p. 54-58.
Hoare, C. A. R.: "Monitors: an operating system structuring concept" Communications of the ACM USA, Oct. 10, 1974, p. 549-556.

(Continued)

*Primary Examiner* — Emerson Puente
*Assistant Examiner* — Adam Lee
(74) *Attorney, Agent, or Firm* — Sughrue Mion, PLLC (57) ABSTRACT

An interruptible thread synchronization method and apparatus are provided. The interruptible thread synchronization method includes controlling mutually exclusive access to an object by one or more threads using a monitor, and interrupting a first thread that is on standby for the monitor. The interruptible thread synchronization method and apparatus allows for access and control of an object by one or more threads.

19 Claims, 6 Drawing Sheets

OTHER PUBLICATIONS

David R. Butenhof, "Programming with POSIX Threads, Chapter 5.3 Cancellation" 1997, pp. 142-161, Addison-Wesley, Boston, XP002524448.

The Open Group, "System Interfaces" Portable Operating System Interface (POSIX), Apr. 30, 2004, pp. 1043-1045. IEEE, XP002524447.

* cited by examiner

INTERRUPTIBLE THREAD SYNCHRONIZATION METHOD AND APPARATUS

CROSS-REFERENCE TO RELATED APPLICATION

This application claims priority from Korean Patent Application No. 10-2006-0018411 filed on Feb. 24, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to synchronization of threads, and more particularly, to an interruptible thread synchronization.

2. Description of the Related Art

Most thread programs enable a plurality of threads to share data. Even when a thread modifies an invariable value of data that is shared with other threads, another thread may use the data. In order to prevent this problem, a program technique called synchronization is needed. Synchronization is a technique of synchronizing a plurality of threads so that all attempts that are made to access to the same data present in a memory can be mutually exclusive. That is, synchronization enables only one thread to use data while making other threads wait for their turn to use the data.

However, in conventional synchronization techniques, even when there is the need to immediately return system resources occupied by a thread, the thread may not be stopped if the thread is on standby to be synchronized for acquiring a monitor.

Therefore, it is necessary to develop techniques of choosing a predetermined thread that is needed from a plurality of threads that are on standby to be synchronized and interrupting the chosen thread from a monitor while not affecting threads that are on standby for a monitor as well as threads that have already acquired the monitor and are currently performing a critical section, and particularly, techniques that do not require modification of a thread library and comply with existing standards, e.g., the Portable Operating System Interface (POSIX) standard.

In the meantime, Korean Patent Laid-Open Gazette No. 10-2004-0068993, entitled "Method and Apparatus for Stopping Execution of Thread Until Predetermined Memory Access Is Made," discloses a technique of temporarily stopping the execution of a thread with the aid of a multi-threading processor. However, this technique can stop the execution of a thread only temporarily, and thus, there is a clear limit in completely releasing from a monitor a thread that is on standby for the monitor.

SUMMARY OF THE INVENTION

The present invention provides an interruptible thread synchronization method and apparatus which can interrupt a thread that is on standby for a monitor that provides mutually exclusive synchronization for a predetermined object.

However, the aspects of the present invention are not restricted to the one set forth herein. The above and other aspects of the present invention will become more apparent to one of daily skill in the art to which the present invention pertains by referencing a detailed description of the present invention given below.

According to an aspect of the present invention, there is provided an interruptible thread synchronization method including controlling mutually exclusive access to an object by one or more threads using a monitor, and interrupting a first thread that is on standby for the monitor.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

Terms used in this disclosure have been defined in consideration of their functions in this disclosure and may have different meanings depending on a user's intent or understanding. Therefore, the terms are defined based on the invention claimed in this disclosure.

Object

An object is an entity that is accessed by threads for the purpose of performing certain functions, and may be realized in various forms, namely, as data items, resources, and code segments.

Synchronization

Synchronization is a state where threads can access a predetermined object in a mutually exclusive manner. In other words, in a case where there are a plurality of threads that attempt to access a predetermined object, synchronization allows only one of the threads to access the predetermined object at a time.

Monitor

A monitor controls attempts to mutually exclusively access a predetermined object. In other words, a monitor synchronizes a plurality of threads with a single object, thereby preventing all the threads from attempting to access the object at the same time. In this manner, only a thread that has acquired a monitor is allowed to access an object. In other words, in order to access a synchronized object, a thread must acquire a monitor corresponding to the synchronized object. In some standards that prescribe the definition of threads, monitor acquirement is referred to as monitor lock. In this disclosure, it is assumed that the terms 'monitor acquirement' and 'monitor lock' bear the same meaning. Examples of a monitor include a mutex or a semaphore of the Portable Operating System Interface (POSIX). The present invention provides new types of monitors, and they will be described later in detail with reference to FIG. 1.

Interrupt

Interrupt is a process of stopping the execution of a thread and performing other functions. According to the present invention, interrupt can be interpreted as a state where a thread that is on standby for a monitor fails to acquire the monitor, is completely released from the monitor, and thus does not request the monitor any longer.

Condition Variable

A condition variable indicates a standby condition of a thread, and places a thread on standby until a predetermined condition becomes true. A thread is put on standby according to a condition variable by signal standby information. An example of the signal standby information is a function pthread_cond_wait of a POSIX application programming interface (API). A thread that is on standby according to a condition variable may be woken up by predetermined signal generation information. According to the present invention, signal generation information may be classified into signal generation information regarding a single signal and signal generation information regarding a broadcast signal.

In an exemplary embodiment, a condition variable operates together with a mutex in order to put threads on standby. For example, if a first thread is blocked by a condition variable that waits for the generation of a predetermined condition after locking a mutex, then the mutex may be unlocked as long as the first thread is blocked. If a second thread modifies a state of the predetermined condition and wakes up the first thread, then the first thread locks the mutex again, and examines the predetermined condition. If the predetermined condition is false, then the first thread may be blocked again by the condition variable. However, if the predetermined condition is true, then the first thread unlocks the mutex, and performs a necessary operation. According to an exemplary embodiment illustrated in FIG. 1, a condition variable can perform the aforementioned processes together with a sub-monitor 110.

Single Signal

A single signal is information that is used to wake up only one of a plurality of threads that are put on standby by a condition variable. According to an exemplary embodiment of the present invention, a thread that is woken up by a single signal may be able to acquire a monitor. An example of a single signal is a function pthread_cond_signal of a POSIX API.

Broadcast Signal

A broadcast signal is information that is used to wake up more than one thread that is put on standby by a condition variable. A plurality of threads are sequentially woken up by a broadcast signal. According to an exemplary embodiment of the present invention, a thread that satisfies a predetermined condition may be interrupted by a broadcast signal. An example of a broadcast signal is a function pthread_cond_broadcast of a POSIX API.

The present invention will hereinafter be described in detail with reference to the accompanying drawings in which exemplary embodiments of the invention are shown.

Figure 1:
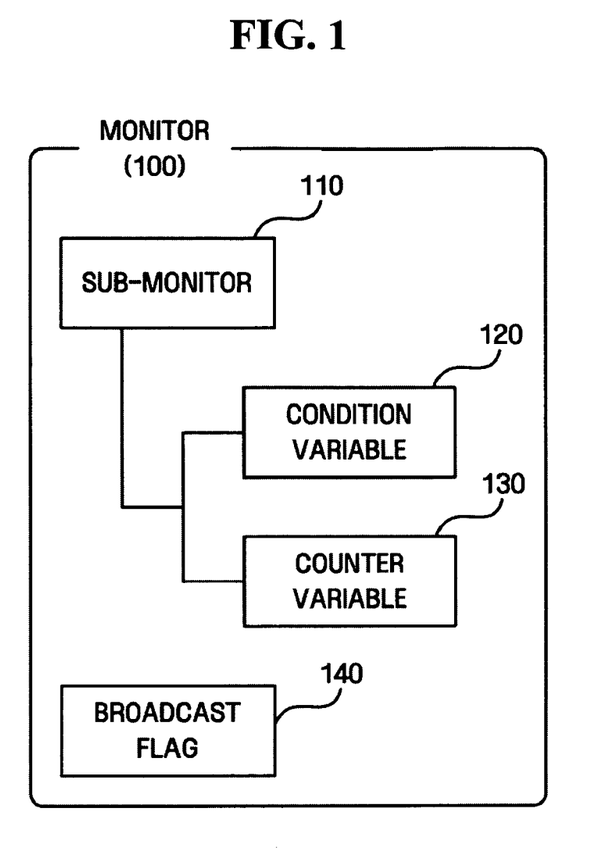
FIG. 1 is a block diagram of a monitor according to an exemplary embodiment of the present invention.

FIG. 1 is a block diagram of a monitor 100 according to an exemplary embodiment of the present invention. Referring to FIG. 1, the monitor 100 includes a sub-monitor 110, a condition variable 120, a counter variable 130, and a broadcast flag 140.

The sub-monitor 110 synchronizes a plurality of threads with information that is present in the monitor 100. In detail, the sub-monitor 110 synchronizes a plurality of threads for the condition variable 120 and the counter variable 130. An example of the sub-monitor is a mutex.

The condition variable 120 provides synchronization of a predetermined object using signal generation information and signal standby information. According to the present exemplary embodiment, when the monitor 100 that has been locked by a first thread is requested by a second thread, the condition variable 120 puts the second thread on standby.

A thread that is on standby can acquire the monitor 100 after being woken up by a single signal. If more than one thread is on standby, then only one of the standby threads may be woken up by a single signal. Threads that are on standby may be woken up by a broadcast signal. In this case, threads that satisfy a predetermined condition are completely released from a standby state by the broadcast signal, while threads that do not satisfy the predetermined condition are placed back on standby.

The counter variable 130 indicates the number of threads that have acquired the monitor 100 and the number of threads that are on standby for the monitor 100. The counter variable 130 may have a nonnegative integer value. Whenever a thread requests the monitor 100, the value of the counter variable 130 increases. On the other hand, whenever a thread that has acquired the monitor 100 releases the monitor 100 or whenever a thread that is on standby for the monitor 100 is interrupted from the monitor 100, the value of the counter variable 130 decreases.

The counter variable 130 may have a nonnegative integer value. The value of the counter variable 130 increases or decreases by 1 at a time. In this case, if the counter variable 130 is set to a value of 1, then it appears that the only thread has acquired the monitor 100 is on standby. If the counter variable 130 is set to a value of 0, then it appears that even the thread that has acquired the monitor 100 does not exist. If the counter variable 130 is set to an integer value N that is greater than 1, then the number of threads that are on standby for the monitor 100 is (N−1) assuming that the counter variable 130 has a nonnegative integer value and increases or decreases by 1 at a time. However, the present invention is not restricted to this.

The broadcast flag 140 has a true value when a broadcast signal is output in order to wake up threads that are on standby for the condition variable 120. A thread to be interrupted may learn from the broadcast flag 140 that the thread to be interrupted must be interrupted from the monitor 100.

Figure 2:
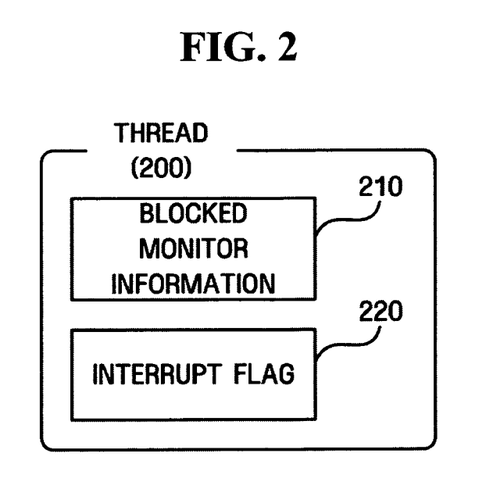
FIG. 2 is a block diagram of a thread according to an exemplary embodiment of the present invention.

FIG. 2 is a block diagram of a thread 200 according to an exemplary embodiment of the present invention. Referring to FIG. 2, the thread 200 includes blocked monitor information 210 and an interrupt flag 220. The thread 200 may include a variety of information other than those set forth herein.

The blocked monitor information 210 includes information regarding a monitor for which the thread 200 has been on standby.

The interrupt flag 220 includes information indicating whether the thread 200 is to be interrupted. For example, if the thread 200 is to be interrupted, then the interrupt flag 220 may be set to a true value. A thread whose interrupt flag 220 is set to a true value may be completely released from a standby state, i.e., may be interrupted from a monitor for which the thread has been on standby, when being woken up by a broadcast signal.

An interruptible thread synchronization method according to an exemplary embodiment of the present invention will hereinafter be described in detail.

Figure 3:
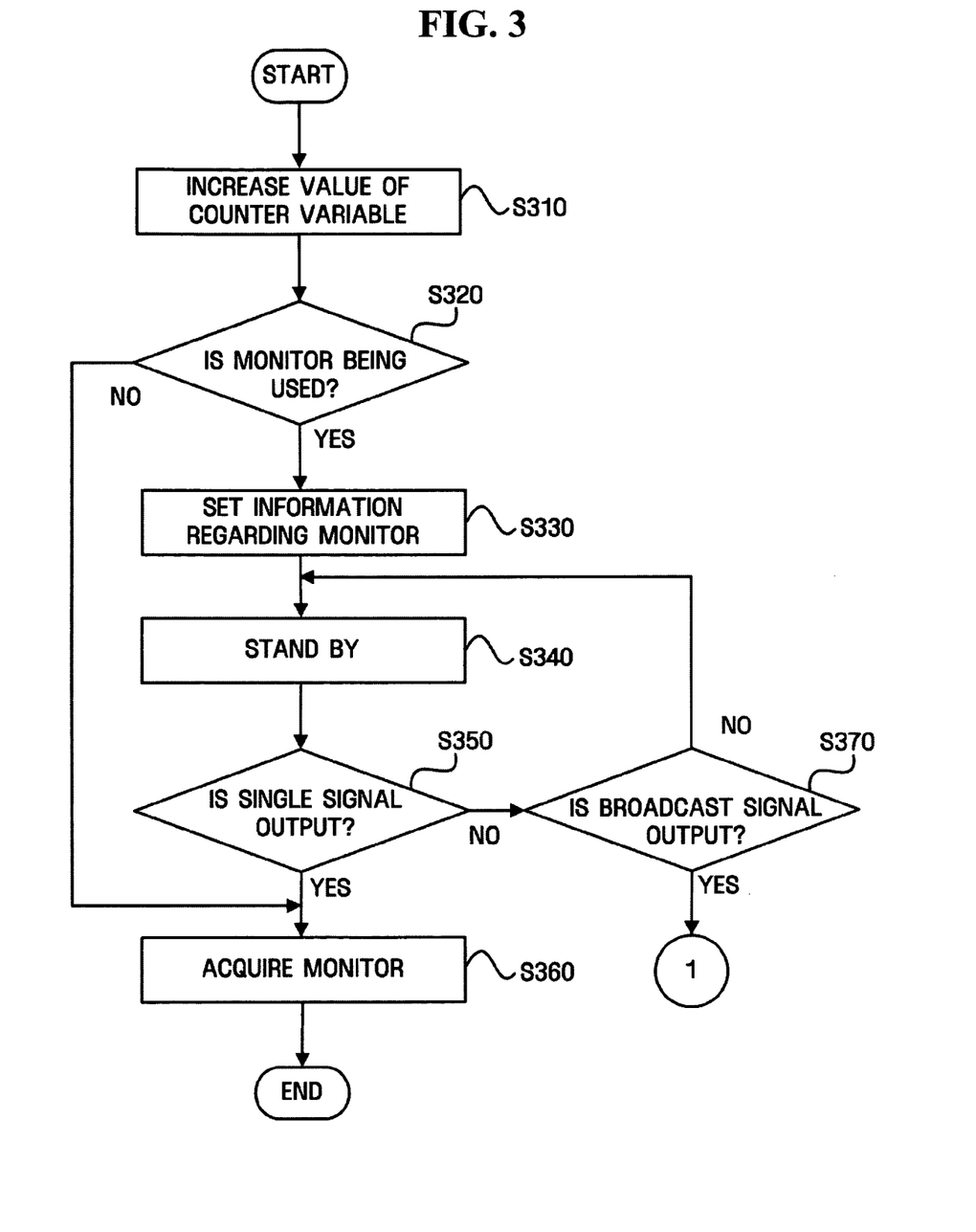
FIG. 3 is a flowchart illustrating a monitor lock process according to an exemplary embodiment of the present invention.

FIG. 3 is a flowchart illustrating a monitor lock process according to an exemplary embodiment of the present invention. Referring to FIG. 3, in operation S3 10, a thread (hereinafter referred to as the request thread) that requests the monitor 100 increases the counter variable 130 of the monitor 100. In operation S320, the request thread determines whether the monitor 100 is currently being used by another thread by referencing the counter variable 130 of the monitor 100. If the counter variable 130 is set to a value of 1, then the monitor 100 can be used by the request thread. However, if the counter variable 130 is set to a value greater than 1, then it may be determined that the monitor 100 is currently being used by a thread other than the request thread. As described above, it is possible to determine the number of threads that are currently on standby for the monitor 100 with reference to the counter variable 130. If the counter variable 130 is set to a value of 1, then no thread is currently on standby for the monitor 100. On the other hand, if the counter variable 130 is set to an integer value N that is greater than 1, then the number of threads that are currently on standby for the monitor 100 may be N−1.

In operation S360, if it is determined in operation S320 that the monitor 100 is not being used by any thread, then the request thread acquires the monitor 100.

On the other hand, in operation S330, if it is determined in operation S320 that the monitor 100 is currently being used by a thread other than the request thread, then the request thread sets information regarding the monitor 100 in blocked monitor information 210 of the request thread. In operation S340, the request thread is placed on standby by the condition variable 120 of the monitor 100.

In operation S350, it is determined whether a single signal has been output by the condition variable 120. In operation S360, if it is determined that a single signal has been output by the condition variable 120, then the request thread wakes up from standby, and acquires the monitor 100. If more than one thread is on standby for the monitor 100, then one of the standby threads may wake up when a single signal is output.

In operation S370, if it is determined that a single signal has not yet been output by the condition variable 120, then it is determined whether a broadcast signal has been output. If it is determined in operation S370 that a broadcast signal has been output, then an interrupt process may be performed for the request thread, and this will be described in detail with reference to FIG. 6.

If neither a single signal nor a broadcast signal is output, then the request thread keeps waiting for the monitor 100.

Figure 4:
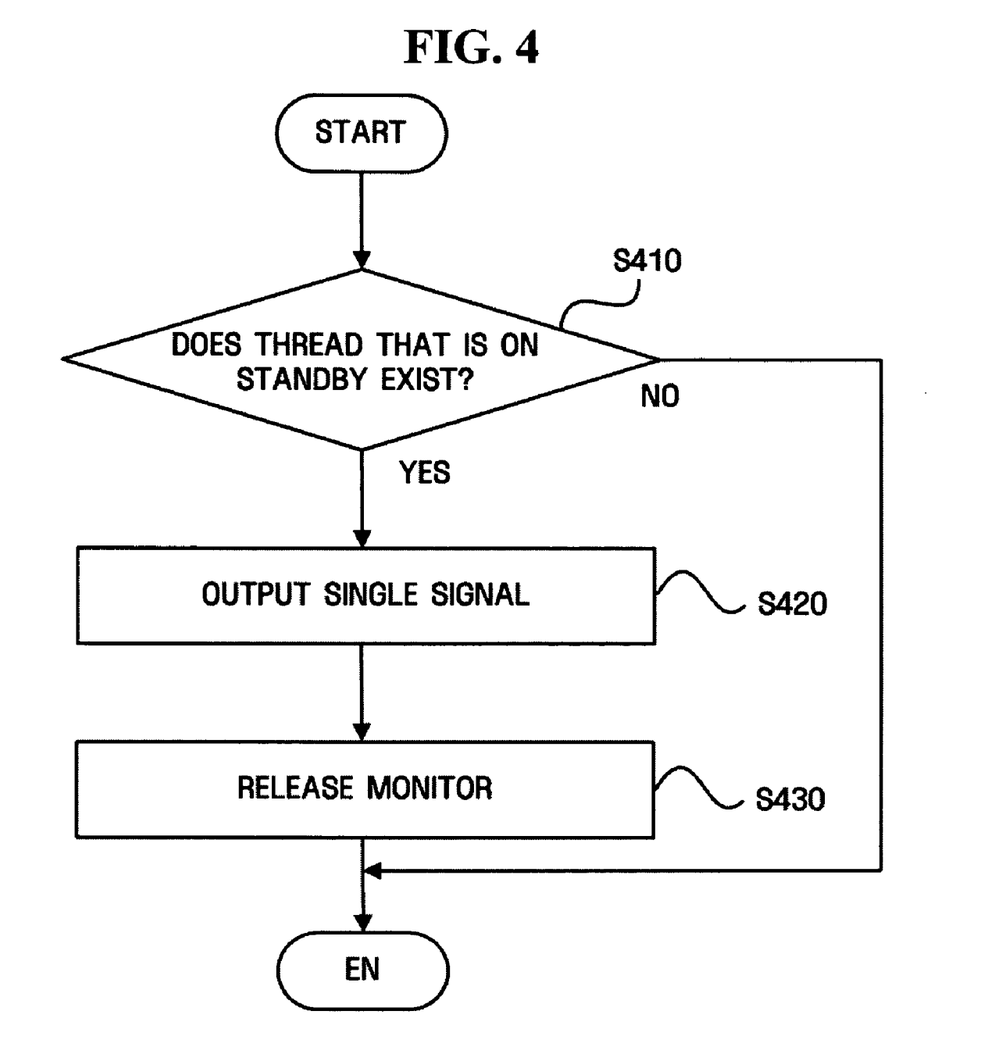
FIG. 4 is a flowchart illustrating a monitor release process according to an exemplary embodiment of the present invention.

FIG. 4 is a flowchart illustrating a monitor release process according to an exemplary embodiment of the present invention. Referring to FIG. 4, in operation S410, in order to release the monitor 100 by terminating a predetermined operation performed on a synchronized object with the aid of the monitor 100, a thread (hereinafter referred to as the release thread) that has acquired the monitor 100 determines whether a thread that is on standby for the monitor 100 exists by referencing the counter variable 130 of the monitor 100.

In detail, since the monitor 100 is yet to be released, the counter variable 130 must be set to a value greater than 0. If the counter variable 130 is set to a value of 1, then it may be determined that no thread is currently on standby for the monitor 100. On the other hand, if the counter variable 130 is set to a value greater than 1, then it may be determined that a thread that is on standby for the monitor 100 exists.

In operation S430, if no thread is on standby for the monitor 100, then the release thread releases the monitor 100 by reducing the value of the counter variable 130 of the monitor 100 by 1 so that the value of the counter variable 130 is changed from 1 to 0.

In operation S420, if it is determined in operation S410 that a thread that is on standby for the monitor 100 exists, then the release thread outputs a single signal for the condition variable 120. In operation S430, the release thread releases the monitor 100 by reducing the value of the counter variable 130 by 1 so that the value of the counter variable 130 is changed from N (where N is an integer value greater than 1) to N−1.

Figure 5:
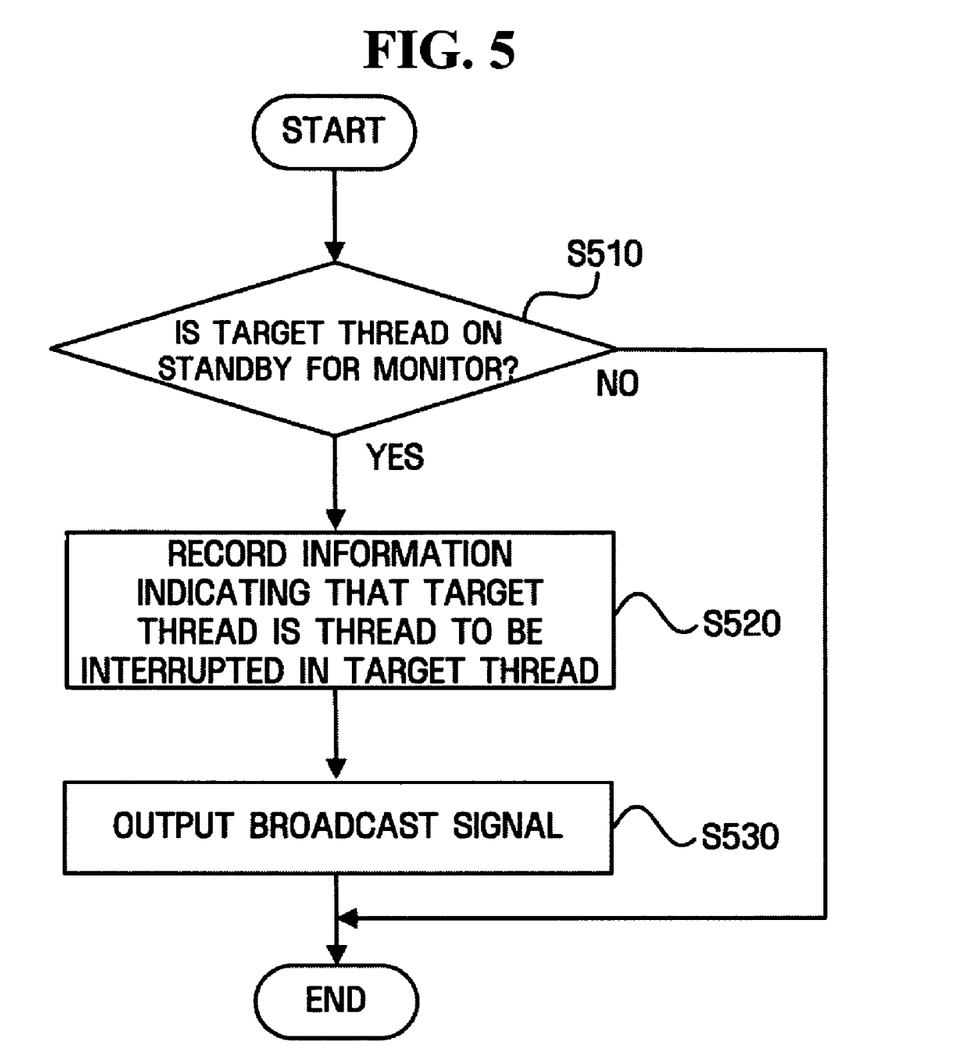
FIG. 5 is a flowchart illustrating an interrupt instruction process according to an exemplary embodiment of the present invention.

FIG. 5 is a flowchart illustrating an interrupt instruction process according to an exemplary embodiment of the present invention. Referring to FIG. 5, in operation S510, a thread (hereinafter referred to as the interrupt instruction thread) that attempts to interrupt another thread (hereinafter referred to as the target thread) determines whether the target thread is on standby for a predetermined monitor by referencing blocked monitor information 210 that is set in the target thread.

In operation S520, if it is determined in operation S510 that the target thread is on standby for the predetermined monitor, then the interrupt instruction thread records predetermined information in the target thread to indicate that the target thread is to be interrupted. The predetermined information may be set as an interrupt flag 220 of the target thread.

Thereafter, in operation S530, the interrupt instruction thread outputs a broadcast signal for a condition variable of the predetermined monitor. In this case, a plurality of threads that are on standby for the condition variable of the predetermined monitor are sequentially woken up in response to the broadcast signal.

Figure 6:
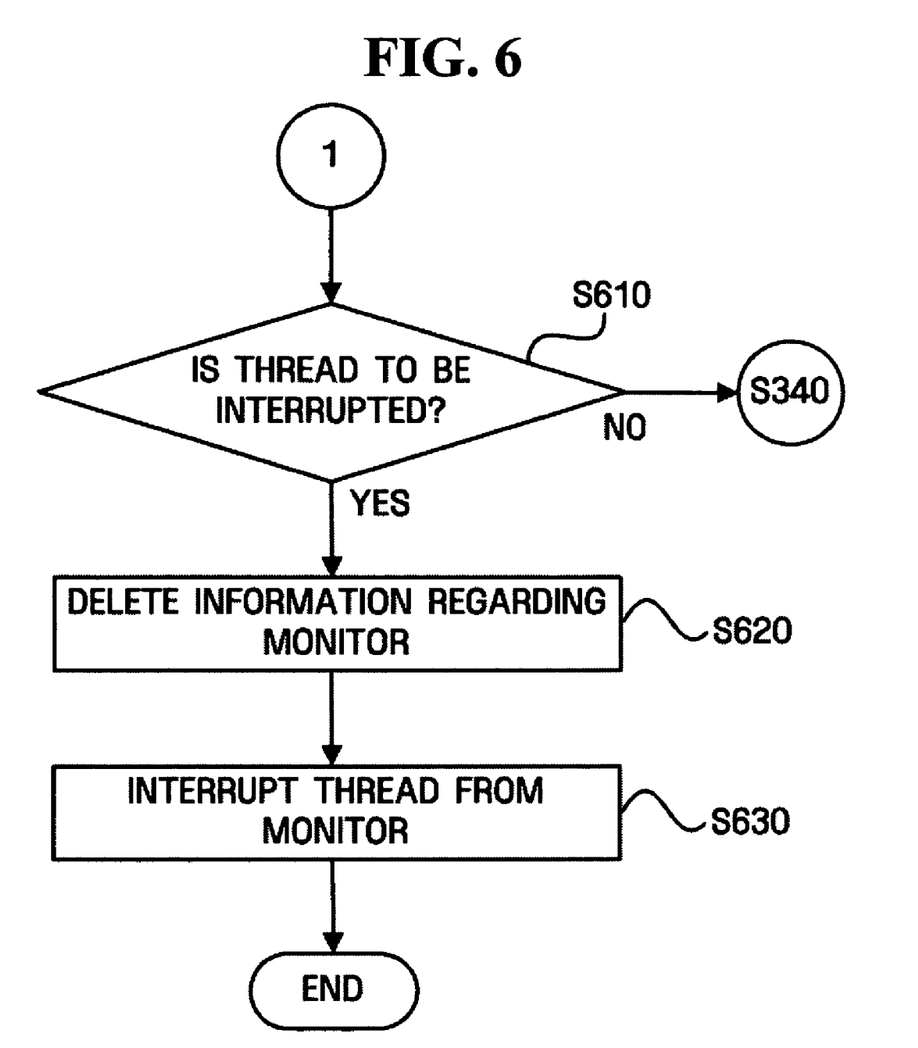
FIG. 6 is a flowchart illustrating an interrupt process according to an exemplary embodiment of the present invention.

FIG. 6 is a flowchart illustrating an interrupt process according to an exemplary embodiment of the present invention. Specifically, FIG. 6 illustrates the operation of a thread that is on standby for a predetermined monitor when a broadcast signal is output in the manner illustrated in FIG. 5, i.e., a series of processes performed when it is determined in operation S370 illustrated in FIG. 3 that a broadcast signal has been output. Referring to FIG. 6, when a broadcast signal is output, a plurality of threads that are on standby sequentially wake up in response to the broadcast signal. In operation S610, a thread that has waken up in response to the broadcast signal determines whether the thread is a thread to be interrupted by referencing an interrupt flag 220 of the thread. An interrupt flag 220 of a thread that is determined to be interrupted stores information indicating that the corresponding thread is to be interrupted, as a result of operation S520 illustrated FIG. 5.

In operation S620, if it is determined in operation S610 that the thread is a thread to be interrupted, then the thread deletes information regarding a monitor for which the thread has been on standby. The information regarding the monitor is set in blocked monitor information 210 of each thread that has been on standby for the monitor.

In operation S630, the thread is interrupted from the monitor by reducing the value of the counter variable 130 of the monitor so that the value of the counter variable 130 is changed from L (where L is an integer value greater than 1) to L−1. Then, the interrupted thread may be driven to perform another operation, or may be terminated.

If it is determined in operation S610 that the thread is not a thread to be interrupted, then the thread may be placed back on standby in operation S340 illustrated in FIG. 3.

The interruptible thread synchronization method according to the present exemplary embodiment may also include controlling synchronization regarding internal information of the monitor 100 with the aid of the sub-monitor 110 of the monitor 110 when a thread attempts to access the internal information of the monitor 100. For example, threads can be prevented from accessing the internal information of the monitor 100 by locking the sub-monitor 110 before operation S410. Thereafter, threads are allowed to access the internal information of the monitor 100 by unlocking the sub-monitor 110 after operation S430.

The present invention can be realized by recording a computer program that comprises computer code for executing the interruptible thread synchronization method described above with reference to FIGS. 1 through 6 in a recording medium such as a flash memory, a compact disc (CD), or a hard disc and executing the computer program from the recording medium.

Figure 7:
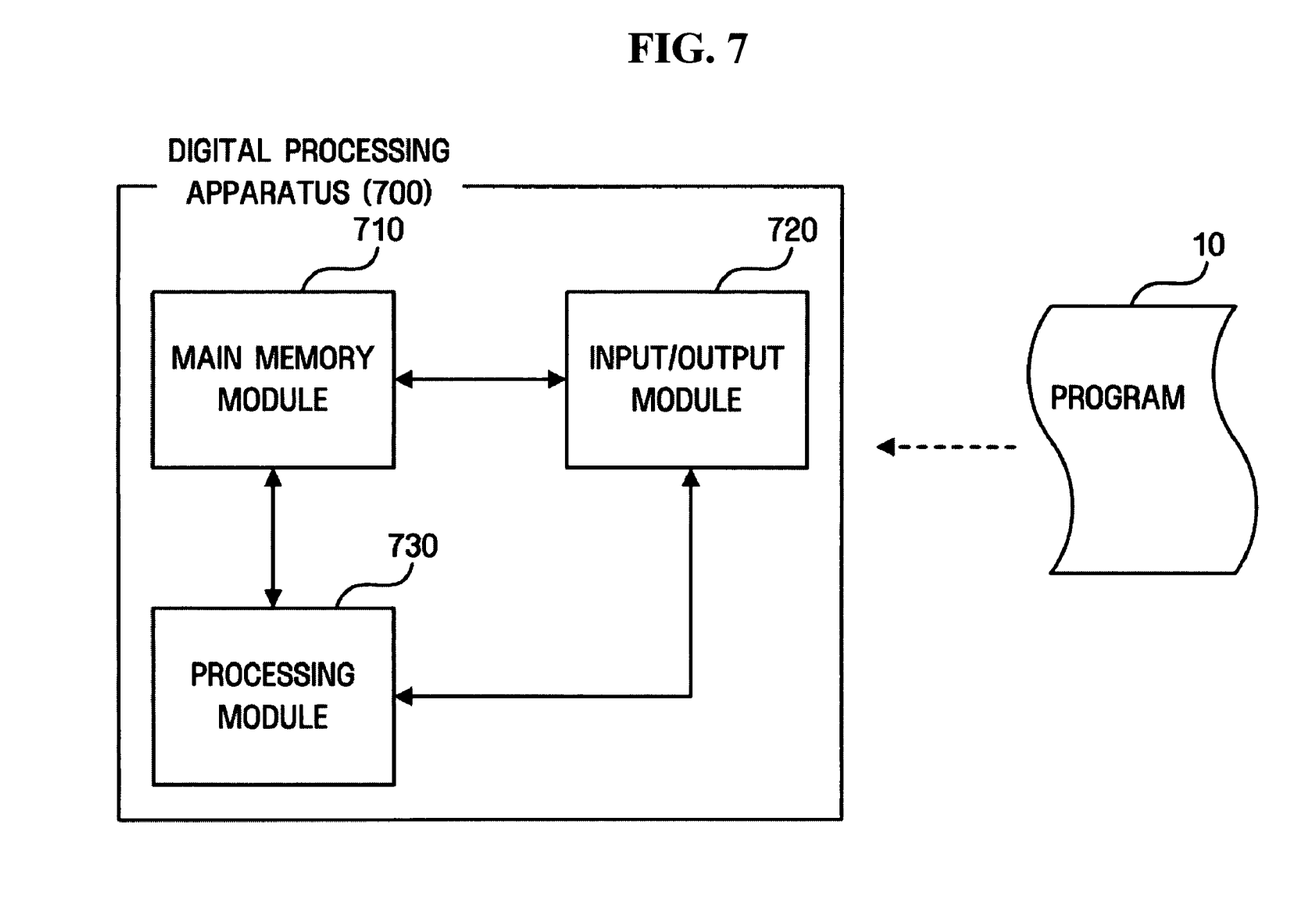
FIG. 7 is a block diagram of a digital processing apparatus according to an exemplary embodiment of the present invention.

FIG. 7 is a block diagram of a digital processing apparatus 700 according to an exemplary embodiment of the present invention. Referring to FIG. 7, the digital processing apparatus 700 includes a main memory module 710, an input/output module 720, and a processing module 730. The digital processing apparatus 700 may be realized as an electronic product having a data storage function and a data processing function such as a mobile phone, a personal digital assistant (PDA), a digital TV, a set-top box, a laptop computer, or a desktop computer.

The main memory module 710 provides memory space that is needed for the execution of a program 10 by the processing module 730. According to the present exemplary embodiment, the main memory module 120 may be realized as a random access memory (RAM) such as a dynamic RAM (DRAM), a static RAM (SRAM), or a synchronous DRAM (SDRAM).

The input/output module 720 provides the processing module 730 with data that is needed for the execution of the program 10, and receives the result of execution of the program 10 by the processing module 730. For example, if a user inputs a request regarding the program 10, which is currently being executed, with the aid of an input device such as a remote control, a keyboard, a keypad, or a mouse, then the input/output module 720 may transmit the request to the processing module 730. Alternatively, the input/output module 720 may output the result of the execution of the program 10 by the processing module 730 to a display device or a speaker.

The processing module 730 executes the program 10. For this, the processing module 730 may execute the program 10 by performing a read operation, a write operation, a conversion operation, or a computation operation. The processing module 730 executes the program 10, thereby realizing, for example, the monitor 100 illustrated in FIG. 1 and the thread 200 illustrated in FIG. 2, and performing the processes described above with reference to FIGS. 3 through 6.

The program 10 may be comprised of computer code that generates the monitor 100 and the thread 200 when being processed by the processing module 730.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As described above, according to the present invention, it is possible to interrupt a predetermined thread from a monitor that provides mutually exclusive synchronization for a predetermined object.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An interruptible thread synchronization method for efficiently accessing an object, the method comprising:
    controlling an exclusive access to an object by threads, using a monitor; and
    interrupting a first one of the threads that are on standby for the monitor;
    wherein the first one of the threads is determined by sequentially waking up at least two of the threads that are on standby for the monitor, checking each of the at least two of the threads for a condition, and
    when a checked one of the at least two threads meets the condition, selecting the checked one of the at least two threads meeting the condition as the first one of the threads, and placing the checked remaining ones of the at least two threads back on standby,
    wherein the selected thread is completely released from the monitor when the selected thread fails to acquire the monitor.

2. The interruptible thread synchronization method of claim 1, wherein the monitor comprises:
    a condition variable which indicates a standby condition; and
    a counter variable which indicates whether a second one of the threads that has acquired the monitor exists and whether a third one of the threads that is on standby for the condition variable exists.

3. The interruptible thread synchronization method of claim 2, wherein the monitor further comprises a sub-monitor which controls exclusive access to the condition variable and the counter variable by the threads.

4. The interruptible thread synchronization method of claim 2, wherein the counter variable has a nonnegative integer value.

5. The interruptible thread synchronization method of claim 2, wherein the controlling comprises:
    enabling the first one of the threads to request the monitor;
    increasing a value of the counter variable; and
    if the second one of the threads exists, placing the first one of the threads on standby for the condition variable.

6. The interruptible thread synchronization method of claim 2, further comprising reducing a value of the counter variable if the second one of the threads terminates a predetermined operation regarding the object.

7. The interruptible thread synchronization method of claim 2, further comprising, if the third one of the threads exists, outputting a single signal that wakes up the third thread that is on standby for the monitor after the second one of the threads terminates a predetermined operation regarding the object.

8. The interruptible thread synchronization method of claim 1, further comprising controlling exclusive access to predetermined information present in the monitor by the threads.

9. The interruptible thread synchronization method of claim 2, wherein the interrupting comprises:
   setting in the first one of the threads information indicating that the first one of the threads is a thread to be interrupted; and outputting a broadcast signal that sequentially wakes up more than one thread that is on standby for the monitor.

10. The interruptible thread synchronization method of claim 9, wherein the interrupting further comprises:
   waking up the first one of the threads in response to the broadcast signal; and reducing a value of the counter variable.

11. The interruptible thread synchronization method of claim 10, wherein the interrupting further comprises deleting information regarding the monitor from the first one of the threads.

12. A computer-readable recording medium having recorded thereon a computer program for executing the interruptible thread synchronization method of any one of claims 1 through 11.

13. A digital processing apparatus comprising:
   a processor executing one or more modules of the apparatus;
   a processing module which executes a program; and
   a main storage module which provides memory space that is needed for an operation of the processing module,
   wherein the program comprises first computer code which controls mutually exclusive access to an object by threads with the aid of a monitor, and second computer code which interrupts a thread from threads that are on standby for the monitor;
   wherein the thread to be interrupted is determined by sequentially waking up at least two of the threads that are on standby for the monitor, checking each of the at least two threads for a condition; and when a checked one of the at least two threads meets the condition, selecting the checked one of the at least two threads meeting the condition as the thread to be interrupted and placing checked remaining ones of the at least two threads back on standby,
   wherein the selected thread is completely released from the monitor when the selected thread fails to acquire the monitor.

14. The interruptible thread synchronization method of claim 1, wherein the selected thread deletes information regarding the monitor for which the selected thread has been on standby.

15. The interruptible thread synchronization method of claim 1,
   wherein the selected thread is driven to perform another operation or is terminated.

16. The digital processing apparatus of claim 13, wherein the selected thread deletes information regarding the monitor for which the selected thread has been on standby.

17. The digital processing apparatus of claim 13, wherein the selected thread is driven to perform another operation or is terminated.

18. The interruptible thread synchronization method of claim 1, wherein the condition is a predetermined condition indicating interruptibility.

19. The digital processing apparatus of claim 13, wherein the condition is a predetermined condition indicating interruptibility.

* * * * *